Patented Aug. 28, 1934

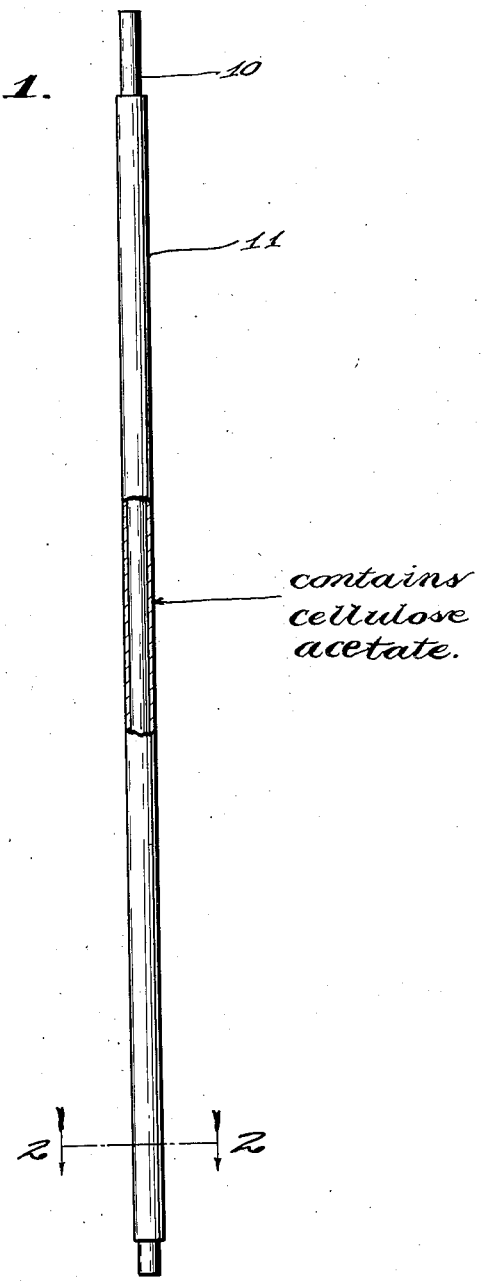

1,972,063

UNITED STATES PATENT OFFICE 1,972,063

COATED FERROUS WELDING ELECTRODE

Paul R. Judy, Muncie, Ind., assignor to Indiana Steel & Wire Company, Muncie, Ind., a corporation of Indiana Application August 11, 1933, Serial No. 684,647

9 Claims. (Cl. 219—8)

It is the object of my invention to provide a coated ferrous welding electrode which makes possible welds of high tensile strength and high ductility and substantially free from inclusions of oxides and nitrides and from gas holes and slag pockets; which will permit a high rate of deposition, and at the same time give such depth of fusion that a weld deposit of proper contour is obtained; the coating of which is substantially free from any tendency to flake or chip off under conditions encountered in storage and handling and in the early stages of the welding operation; and which yields a slag that is easily removable.

In attaining this object, I provide a coating mixture, which, in addition to any desired or usual fluxing and/or slag-forming ingredients, includes a substantial quantity of cellulose acetate. The quantity of cellulose acetate may vary within wide limits, from between about 5% to about 50%, although best results are obtained with quantities between 12.5% and 35%, the amount desirably varying roughly inversely with the weight of coating. The character and amount of the other ingredients may also vary within wide limits.

In addition to the cellulose acetate, which is present in powdered form, there should also be present a substantial quantity of an alkali-metal silicate, conveniently sodium silicate (such as water glass), desirably added in liquid form and in any case mixed through the coating in the presence of water so that the particles of powder, particularly of the cellulose acetate, are substantially coated thereby. The quantity of the alkali-metal silicate may vary from about 15% to 50%, but is desirably between 20% and 40%.

There is also desirably present in the coating a solid oxide which remains solid at least up to a temperature approximating the melting point of the electrode core and which has acid properties in the forming of a slag from the coating mixture.

Still further, it is desirable that there be present either a basic oxide or a silicate of some metal other than an alkali metal, or both.

Various ingredients in addition to those above named may also be used at discretion and in such amount as may be desired.

Cellulose acetate has a number of functions and advantages. Among them are:

1. On being raised to the temperature incident to welding, it burns to produce oxides of carbon, probably both carbon monoxide and carbon dioxide; which serve to shield the arc, and the weld which is being formed, from contact with the air and from the inclusion of oxides and nitrides as well as from oxidation. This is of course more pronounced in thick coatings, but exists to an appreciable extent in thin coatings; and so for this function it is desirable to have a larger percentage of cellulose acetate when the coating is thin.

2. It holds its solid form in the coating mixture, with substantially no melting, up to the temperature where it burns to form carbon oxides; so that the coating may stay in place substantially down to the point where the electrode wire is melted into the arc, and in thick coatings usually even somewhat beyond that so that the arc is kept within an inverted crater formed by the protruding shell of coating.

3. It does not react with sodium or potassium silicate, so that it can be used in the mixture with either or both of those silicates without the necessity for the pre-treatment which is required when such things as wood flour are used.

4. It has little or no tendency to swell, either by hygroscopic action or by action of heat; so that it creates no tendency to produce a flaking off of the coating.

The accompanying drawing shows a coated welding electrode embodying my invention: Fig. 1 is an elevation of such a coated welding electrode, partially broken away to show a longitudinal section; and Fig. 2 is a cross-section, on the line 2—2 of Fig. 1.

As shown in such drawing, the electrode has a central ferrous wire or rod 10, which is covered for all or the greater part of its length by a dried and usually baked coating 11 which contains powdered cellulose acetate as an essential ingredient. The ferrous core 10 may vary in composition in accordance with the character of the ferrous weld which it is desired to obtain.

The cellulose acetate may be combined in various ways with other ingredients to form the complete coating. Great variation may be made in the other ingredients used.

The following are examples:

Example 1

| Ingredients | Parts by weight |
|---|---|
| Cellulose acetate | 50 |
| Aluminum silicate (such as kaolin) | 37.5 |
| Aluminum oxide | 15 |
| Magnesium silicate (such as talc) | 25 |
| Ferromanganese | 30 |
| Commercial sodium silicate (liquid) which contains free silica in varying amount | 115 |
| Total | 272.5 |

The solid ingredients, desirably in powdered form, are suitably mixed in dry form, and then mixed thoroughly into the liquid sodium silicate. Some water may be added, if desired, to obtain a thinner consistency, although this is wholly optional; for it is desirable that the paste be of such consistency that it may be extruded through dies in known manner to form a coating sleeve about the ferrous welding-electrode wire, although the coating may also be applied in other ways, such as dipping. The sodium silicate added may be in solid form, if desired, but in that case water is added to produce a solution. The thickness of the coating may vary, but with this type of coating it usually does not exceed $\frac{1}{32}$ of an inch for a wire of $\frac{1}{8}$ inch diameter, a commonly used size for welding electrodes.

Example 2

| Ingredients | Parts by weight |
|---|---|
| Cellulose acetate | 15 |
| Sodium silicate (liquid) | 35 |
| Ferromanganese | 10 |
| Silica flour | 15 |
| Iron oxide | 25 |
| Total | 100 |

These are mixed and applied in the same way as that outlined in Example 1. The iron oxide may if desired be in the form of hematite, desirably specular hematite, although ordinarily red hematite or red iron oxide may be used. Other basic oxides can be used, such for instance as oxides of calcium, magnesium, or manganese. By the term "oxide", I also include compounds which readily yield the oxides on heating, such as the corresponding hydroxides or carbonates, which do not react with the sodium silicate.

Example 3

| Ingredients | Parts by weight |
|---|---|
| Cellulose acetate | 15 to 30 |
| Sodium silicate (liquid) | 25 to 40 |
| Ferromanganese | 7.5 to 15 |
| Magnesium silicate (such as talc) and/or aluminum silicate (such as kaolin) | 20 to 30 |
| An acidic oxide | 5 to 20 |

These are mixed and applied in the same way as that outlined in Example 1. The acidic oxide may for instance be titanium dioxide, zirconium dioxide, chromic oxide, or silica.

Ferromanganese is always a desirable ingredient in coating compositions. However, it is not an essential one; and it may be omitted in some instances, or it may be replaced in part or in whole by other compounds of manganese, desirably those which also contain some iron, such for instance as silico-manganese or ferrosilicon, or by other compounds of iron. These are all ferro-alloys.

The silica flour or other acidic oxide, and/or the sodium silicate, which are given in the above examples, may be increased or diminished in amount; and, as Example 1 shows, the silica flour may even be omitted. These ingredients serve to adjust the basicity of the slag which is obtained when the coated electrode is used, and may be respectively increased or decreased in amount as it is desired to decrease or increase that basicity.

The liquid sodium silicate may be ordinary water-glass, which usually contains about 60% water, and always contains free silica. Thus it may vary in the proportion of silica to sodium; and the amount of silica flour or other acidic oxide added depends somewhat on the composition of the liquid sodium silicate as well as on the amount of the sodium silicate used. Other alkali-metal silicates, such as potassium silicate, may be used in place of sodium silicate.

Such alkali-metal silicates and cellulose acetate may be used together, by my invention, in many other coating mixtures besides those given in the examples.

The cellulose acetate is used in powdered form. It is insoluble in water, and is relatively non-inflammable, in comparison for instance with nitro-cellulose. At the temperature of the welding arc, however, it decomposes and burns to form oxides of carbon, which effectively shield the arc. These and other desirable features make cellulose acetate highly suitable for use as an organic reducing agent in an electrode coating.

I claim as my invention:

1. A coated ferrous welding electrode having a coating formed of a mixture which contains at least 5% of finely divided solid cellulose acetate, and at least 15% of an alkali-metal silicate.

2. A coated ferrous welding electrode having a coating formed of a mixture which contains at least 5% of finely divided solid cellulose acetate, at least 15% of an alkali-metal silicate, and a solid oxide which remains solid at least up to a temperature approximating the melting point of the electrode core and which has acid properties in the forming of a slag from the coating mixture.

3. A coated ferrous welding electrode having a coating formed of a mixture which contains at least 5% of finely divided solid cellulose acetate, at least 15% of an alkali-metal silicate, and titanium dioxide.

4. A coated ferrous welding electrode having a coating formed of a mixture which contains at least 5% of finely divided solid cellulose acetate, at least 15% of an alkali-metal silicate, and zirconium dioxide.

5. A coated ferrous welding electrode having a coating formed of a mixture which contains at least 5% of finely divided solid cellulose acetate, at least 15% of an alkali-metal silicate, and silica.

6. A coated ferrous welding electrode having a coating formed of a mixture which contains at least 5% of finely divided solid cellulose acetate, at least 15% of an alkali-metal silicate, and another compound of silicon.

7. A coated ferrous welding electrode having a coating formed of a mixture which contains at least 5% of finely divided solid cellulose acetate, at least 15% of an alkali-metal silicate, and a silicate of another metal.

8. A coated ferrous welding electrode having a coating formed of a mixture which contains at least 5% of finely divided solid cellulose acetate, at least 15% of an alkali-metal silicate, a silicate of another metal, and a solid oxide which remains solid at least up to a temperature approximating the melting point of the electrode core and which has acid properties in the forming of a slag from the coating mixture.

9. A coated ferrous welding electrode having a coating formed of a mixture which contains at least 5% of finely divided solid cellulose acetate, at least 15% of an alkali-metal silicate, a solid oxide which remains solid at least up to a temperature approximating the melting point of the electrode core and which has acid properties in the forming of a slag from the coating mixture, and a basic oxide.

PAUL R. JUDY.